US007612761B2

(12) United States Patent
Wong et al.

(10) Patent No.: US 7,612,761 B2
(45) Date of Patent: *Nov. 3, 2009

(54) MECHANISM FOR DISPLAYING PAGINATED CONTENT ON ELECTRONIC DISPLAY DEVICES

(75) Inventors: Yoon Kean Wong, Menlo Park, CA (US); Kenneth Dean Comstock, Cupertino, CA (US); Scott Richard Andress, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/128,553

(22) Filed: May 28, 2008

(65) Prior Publication Data

US 2008/0288887 A1 Nov. 20, 2008

Related U.S. Application Data

(63) Continuation of application No. 11/112,183, filed on Apr. 22, 2005, now Pat. No. 7,394,452, which is a continuation of application No. 09/854,316, filed on May 11, 2001, now Pat. No. 6,943,773.

(51) Int. Cl.
*G09G 5/00* (2006.01)
(52) U.S. Cl. .................................. 345/156; 715/864

(58) Field of Classification Search ......... 345/156–158, 345/682, 684, 901; 715/784, 785, 786, 864
See application file for complete search history.

(56) References Cited

U.S. PATENT DOCUMENTS

| 6,061,050 A * | 5/2000 | Allport et al. ............... 345/173 |
| 6,407,757 B1 * | 6/2002 | Ho ............................. 715/776 |
| 6,441,811 B1 * | 8/2002 | Sawada et al. ............. 345/204 |
| 6,765,559 B2 * | 7/2004 | Hayakawa .................. 345/173 |
| 7,170,500 B2 * | 1/2007 | Canova, Jr. ................. 345/173 |
| 7,394,452 B2 * | 7/2008 | Wong et al. ................. 345/156 |

* cited by examiner

*Primary Examiner*—Richard Hjerpe
*Assistant Examiner*—Tom V Sheng
(74) *Attorney, Agent, or Firm*—Mahamedi Paradice Kriesman LLP (57) ABSTRACT

A computing device is provided that includes a display comprising a plurality of discrete elements. A memory is used to store a data collection of paginated content. A processor of the computing device is configured to retrieve each of the pages from the memory. The processor signals the display to individually present each of the pages. A sensor device is coupled to the processor. The sensor device is deflectable to signal the processor a deflection value that causes the processor to sequentially present at least portions of multiple pages on the display.

23 Claims, 8 Drawing Sheets

MECHANISM FOR DISPLAYING PAGINATED CONTENT ON ELECTRONIC DISPLAY DEVICES

RELATED APPLICATION INFORMATION

This application is a continuation application of U.S. patent application Ser. No. 11/112,183, filed Apr. 22, 2005 now U.S. Pat. No. 7,394,452, entitled "COMPUTING DEVICE FOR DISPLAYING CONTENT IN PAGES OR IN SEQUENCE," which is a continuation of U.S. patent application Ser. No. 09/854,316, filed May 11, 2001, now U.S. Pat. No. 6,943,773, entitled "PAGE FLICKING MECHANISM FOR ELECTRONIC DISPLAY DEVICES THAT PAGINATE CONTENT"; all of the aforementioned priority applications being hereby incorporated by reference in their entirety.

FIELD OF THE INVENTION

The present invention relates to displays for computer devices. In particular, the present invention pertains to a page flicking mechanism for a display of a computer device.

BACKGROUND OF THE INVENTION

Flexible display technology is an advancing area in the field of computing devices. Many applications are being planned and designed to incorporate flexible display technology. Currently, products described as "electronic paper" or "e-paper" are being integrated with computing tablets, handheld computers and other computing devices. Consumer applications for flexible display technology includes electronic books and magazines.

Electronic book applications are currently popular for computing devices such as handheld computers and laptops. In general, electronic books are documents formatted to be paginated on the display of the computing device. A user can scroll the display to view different portions of the same page. The user can also select to view other pages. To make selections for other pages, the user typically has to select a user-interactive feature, such as an icon on the display, or a mechanical button. The page that appears after the user's selection coincides with a page stored as the next or adjacent page to the existing page appearing on the display. If the user wishes to scroll through many pages, the user is required to make repeated entries into the user-interactive feature, or perhaps make one sustained entry.

SUMMARY OF THE INVENTION

A computing device is provided that is capable of displaying paginated content on a display. A deflective input mechanism is incorporated with the computing device. A user can deflect the input mechanism to signal a page flick. A processor of the computing device configures the pagination appearing on the display in response to the deflection of the input mechanism.

The processor may cause the display to present several pages of the content in succession as the response to the deflection of the input mechanism. The pages appearing on the display may also skip with reference to a predetermined order of each page in the paginated content.

The deflective input mechanism may be integrated or otherwise include the display of the computing device. In one embodiment, the display is formed of flexible "electronic paper", to enable bending or flexing by the user. A sensor of the input mechanism may measure a deflection of the display in order to signal the processor a deflection value. To accommodate the display, other components of the computing device, such as the PCB, the digitizer and the housing, may also be deflectable.

Another embodiment may include a deflective sensor device that is coupleable to one of the flexible components of the computing device. The sensor device may be integrated with a deflective housing or PCB to measure the deflection caused by the user.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIG. 10A-10C are illustrative diagrams of a display including discrete elements affected by a flicking of a user, under an embodiment of the invention.

DETAILED DESCRIPTION OF THE INVENTION

Embodiments of the invention describe a page flicking mechanism for a computing device that displays paginated content. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

Embodiments of the invention provide a page flicking mechanism for a computing device that displays paginated content. In an embodiment, a display of the computing device includes a plurality of discrete elements, such as pixels. A memory is used to store a data collection. The data collection is arranged or otherwise identifiable as a plurality of pages. The pages of the data collection are arranged in a pre-selected order, and are each individually presentable on the display. The computing device includes a processor that is configured to retrieve the pages from the memory. The processor is also configured to signal each of the pages for presentation on the display. A sensor device is coupled to the processor. The sensor device is deflectable to signal the processor a deflection value when deflected. The deflection value causes the processor to sequentially present all or some of the multiple pages, in a sequential and individual manner.

A display may include any device that responds to electrical signals to output an image. An image presented on the display may be a partial, complete, or approximate rendering of data stored for that page.

When multiple pages are sequentially presented, portions of the display render an image from each of the multiple pages in a sequence, so that one page may follow another on a portion of the display. It is possible that an area of the display presents portions of multiple pages concurrently and in a sequential manner. For example, groups of discrete elements of the display may be assigned values from one of the multiple pages, and then a next, while another group of discrete elements are static.

As used herein, reference to deflection means any type of bending, deformation or movement by a structure that noticeably alters its shape. In one embodiment, deflection refers to a cantilevering movement of one end of a structure relative to another.

Figure 1:
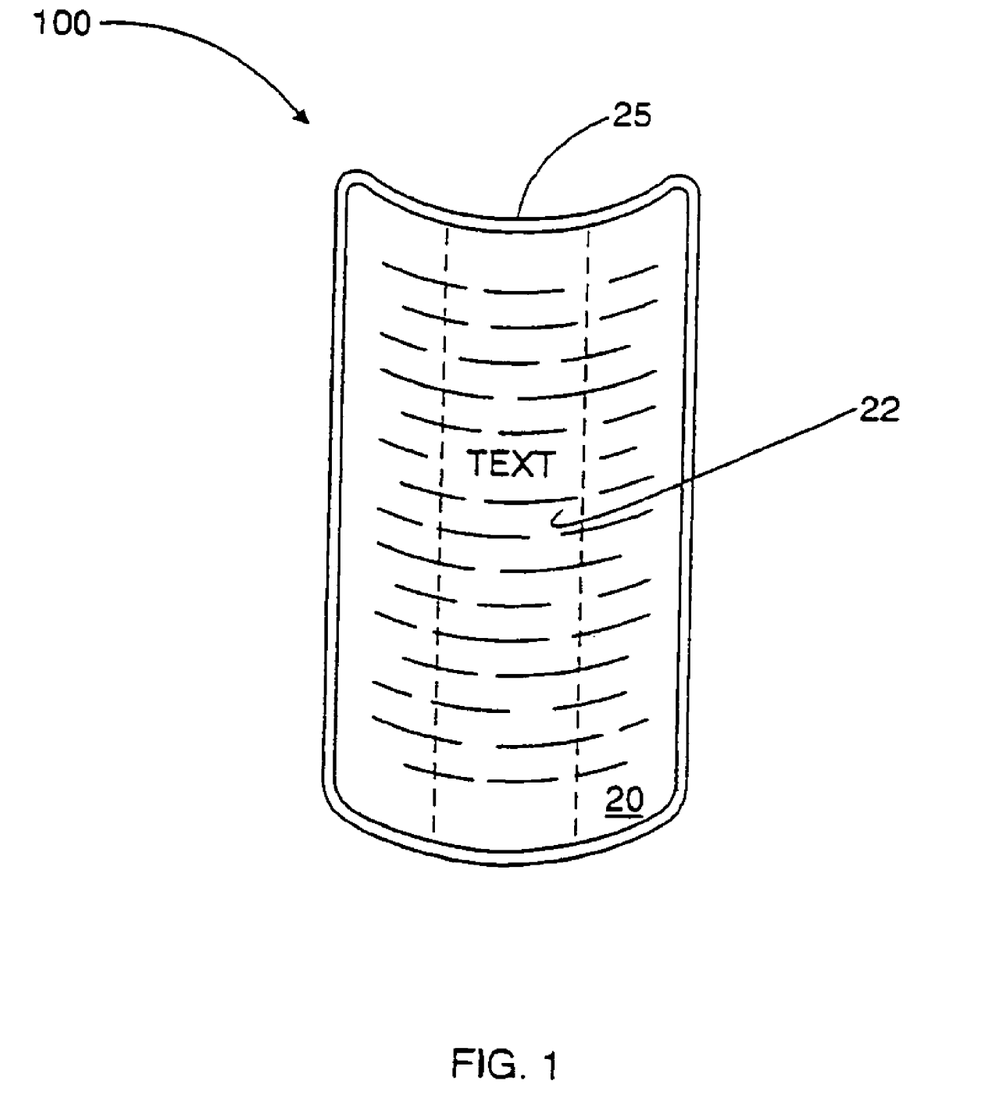
FIG. 1 is a top view of a computing device including a flexible display that can be deflected to enable flicking by a user, under an embodiment of the invention.

FIG. 1 illustrates a computing device 100 equipped with a page flicking mechanism, under an embodiment of the invention. The computing device 100 includes a flexing or deflective display 20 that presents paginated information. The display 20 is connected to a frame 25. In one embodiment, both display 20 and frame 25 are bendable along one or more axes of the computer device 100.

The display 20 may be a form of electronic paper. Electronic paper refers to a flexible display, used for applications such as electronic books. An example of electronic paper for use with embodiments of the invention includes conductive plastic substrates combined with organic transistors, manufactured jointly by E Ink Corp. and Lucent Technologies (see *Electronic Paper Writes New Chapter for Displays*; Brown, C.; EETimes.com, Nov. 30, 2000; hereby incorporated by reference). Another example of electronic paper includes gyricon substrates, manufactured by Xerox.

As will be described in greater detail, the display 20 can be deflected to enable a user to enter an input. The deflection entered by the user causes the pagination being presented on the display 20 to be altered. Specifically, an embodiment provides that a region 22 of display 20 sequentially presents other pages based on the deflection of display 20. The display region 22 may be centrally disposed on display 20 where the deflection is least impairing to the user. The sequential presentation of the pages on display region 22 provides the appearance of page flicking.

The computing device 100 may be configured to measure the magnitude of the deflection and to correlate the magnitude with a characteristic of the page flicking. A larger magnitude flexing of display 20 may signal rapid page flicking, and possible skipping of intermediate pages. A smaller magnitude flexing of display 20 may correlate to a slower page turn, without any skipping of pages. For example, a large deflection of display 20 may result in display region 22 displaying pages 1, 5, 10, 15 and 20 in one time interval. A small deflection may cause display region 22 to display pages 1, 2 and 3 in a longer time interval.

Other portions of display 20 outside of display region 22 may display content other than the pages being flicked through. For example, the presentation on the other portions of display 20 may be frozen on a current page, or blurred to save processing resources.

Figure 2:
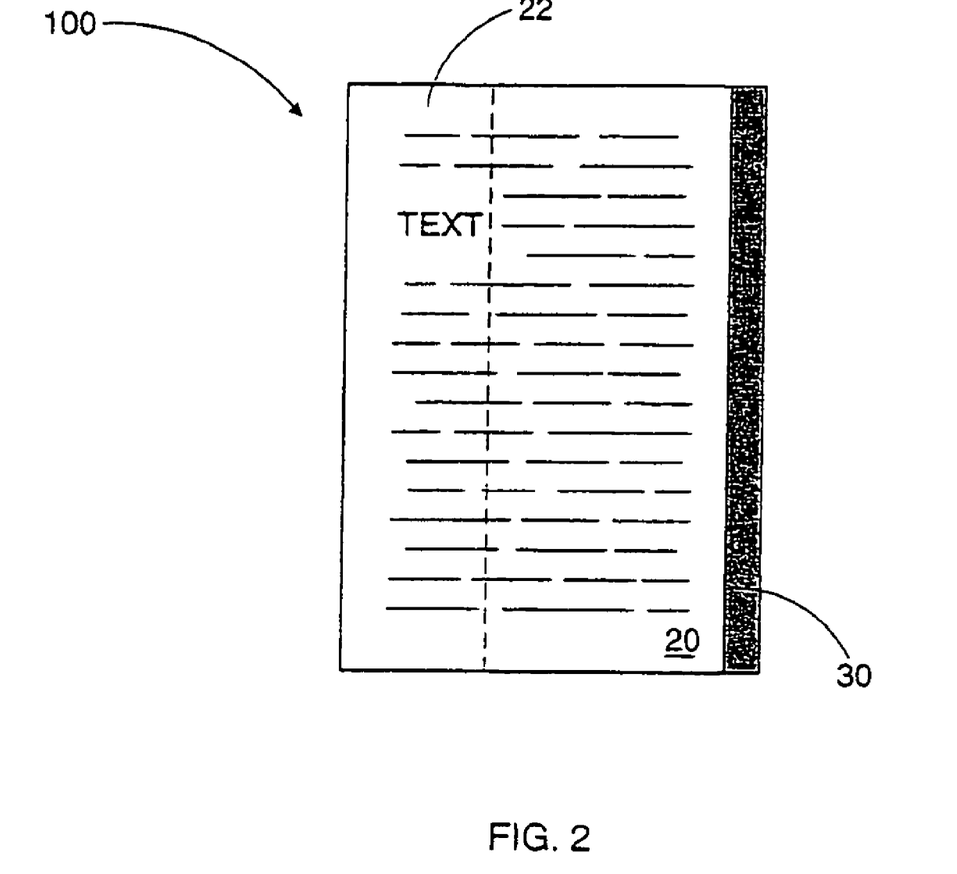
FIG. 2 is a top view of a computing device including a flexible housing portion to enable flicking by a user, under another embodiment of the invention.

FIG. 2 illustrates another embodiment in which computing device 100 separates display 20 from a deflectable portion 30 (FIG. 30). The deflectable portion 20 may be integrated with a sensor (see e.g. 130, FIG. 4) to detect deflection caused by the user of the computing device 100. When the deflectable portion 30 is deflected, the display 20 displays multiple pages in a sequential manner on display region 22. For such an embodiment, display region 22 may be disposed closer to an edge farthest away from deflectable portion 30.

Figure 3:
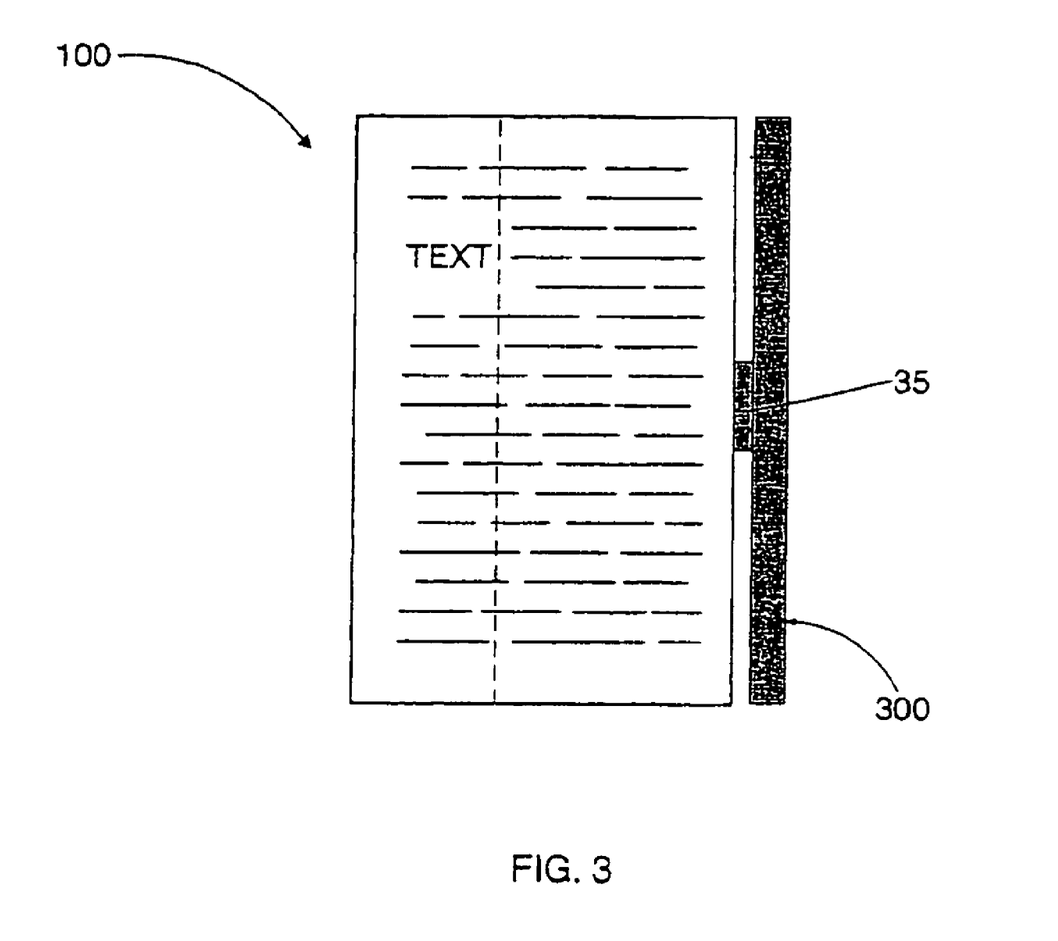
FIG. 3 is a top view of a computing device assembly including a flexible attachment to enabling flicking by a user, under another embodiment of the invention.

FIG. 3 illustrates an embodiment in which computing device 100 is coupleable to deflectable portion 30. In an embodiment, deflectable portion 30 can be connected to the side of computing device 100 through an attachment mechanism 35. The attachment mechanism 35 may include communication resources for signaling deflection values to a processor 140 (see FIG. 4) of computing device 100. Alternatively, a peripheral expansion slot (see e.g. 102 FIG. 4) may extend communications between a sensor contained within the deflectable portion 30 and a processor of the computing device 100.

B. Hardware Components

Figure 4:
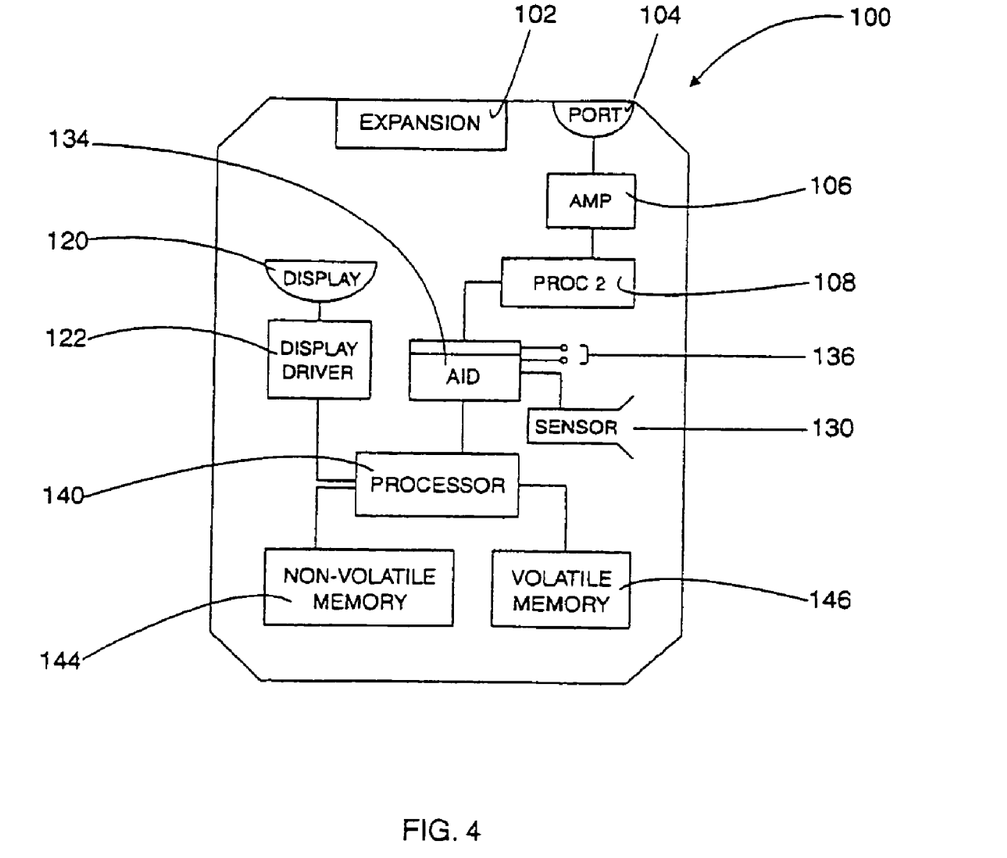
FIG. 4 is a block diagram illustrating components for use with an embodiment of the invention.

FIG. 4 is a block diagram of computing device 100, including components for presenting and changing pages on a display. The computing device 100 includes a processor 140 coupled to a first memory 144 and a second memory 146. The processor 140 is coupled to a display driver 122. The processor 140 combines with display driver 122 to process and signal data for presentation on a display 120. A sensor 130 is coupled to processor 140 via an analog-digital (AD) converter 132.

The computing device 100 may include one or more expansion slots. In an embodiment shown, a first peripheral port 102 enables one or more types of accessory devices to be connected to processor 140. In addition, computing device 100 may include a wireless peripheral port 104 that enables information to be communicated to processor 140 from an external source. The wireless peripheral port 104 forwards incoming communications to an amplifier 106 for processor 140. A second processor 108 intercepts communications incoming to and/or outgoing from wireless peripheral port 104 for purpose of facilitating conversion of data signals between formats and protocols of wireless communications, and those that can be processed by processor 140.

The display 120 cooperates with display driver 122 to display paginated content such as text-based information. For example, display 120 may be used to display pages from electronic books. The paginated content may be primarily in the form of text, although other information such as images, video clips and animation, may also be presented on display 120. In an embodiment, first memory 144 corresponds to non-volatile memory for computing device 100. The first memory 144 stores a data collection corresponding to the paginated content. The processor 140 accesses first memory 144 to retrieve the data. The processor 140 combines with display driver 122 to present the data in a paginated format on display 120.

To present a selected page, processor 140 accesses first memory 144 for values in the data collection that are assigned to the selected page. Each selected page of the paginated content is presentable on display 120 while other pages are cached in second memory 146. Alternatively, the data collection may be signaled to processor 140 from a peripheral device, through first peripheral port 102 or wireless peripheral port 104. Either first memory 144 or second memory 146 may be used to store portions of the data collection received from the peripheral device. The second memory 146 may be used to buffer or cache the data collection while one or more of the pages from the data collection is being displayed.

The sensor 130 is used to detect a deflection entered as input by a user. The deflection input may be measured as an analog value that is signaled to processor 140. The deflection input causes portions of one or more pages from the data collection to be displayed on at least a portion of display 120. The deflection is measured by sensor 130 for processor 140. In this way, the user may deflect a component of computing device 100 to signal an input to the processor 140. The processor uses a detected value of the input to present multiple pages on all or portions of display 120 over the course of a selected time period. As will be further described, embodiments of the invention allow for sensor 130 to detect deflection created on sensor 130, display 120, on a printed circuit board (PCB) of computing device 100, on a housing of computing device 100, or on a combination of sensor 130 and another component of computing device 100. The deflection may simulate the bending of a book or stack of pages, prior to their pages being flicked.

In an embodiment, the analog value measured by sensor 130 reflects the magnitude of the deflection, as well as other characteristics such as its duration, or flick speed. To process the information detected by sensor 130, AD converter 134 is coupled to receive the analog input from sensor 130. The AD converter 134 converts the analog input into a digital format for processing by processor 140. The AD converter 134 may also include several channels to receive other analog inputs or values from other components. For example, one of the channels 136 may be coupled to a digitizer 260 (see FIG. 5-7) of computing device 100 to detect position information of a stylus in contact with display 120.

Figure 5:
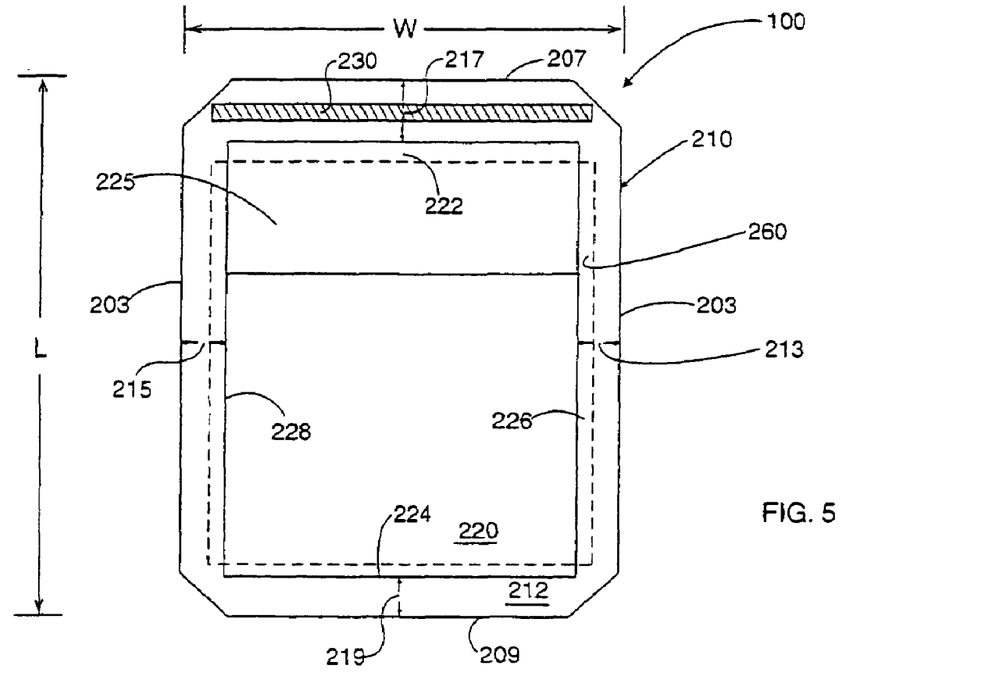
FIG. 5 is a top view of a computing device illustrating a configuration for a sensor device, under an embodiment of the invention.

FIG. 5 is a top view of computing device 100, illustrating positioning of a sensor device 230, under an embodiment of the invention. The sensor device 230 may perform functions as described with sensor 130 (FIG. 4), but is combined or housed within a deflectable structure. The sensor device 230 may be combined with another deflectable component (such as display 120) to correlate the deflection of the sensor device 230 with deflection of the other component.

In an embodiment shown by FIGS. 2 and 3, computing device 100 is a tablet having a length L extending between a top 207 and a bottom 209. A width W extends between lateral sides 203, 203. A housing 210 of computing device 100 retains display 120 (FIG. 1), as well as housing other components. The housing 210 retains a digitizer 260 in cooperation with display 120. Among other functionalities provided, digitizer 260 enables input to be entered onto display 120 through contact. The digitizer 260 detects the position of the contact and correlates the position contact with an input. The digitizer 260 may be positioned on top of display 120, or be overlaid by display 120. For the embodiment shown, digitizer 260 is assumed to be under display 120. In some computing device 100, digitizer 260 may extend beyond display 120 along the top edge 222, bottom edge 224, or one of the lateral edges 226, 228. In particular, for many types of devices, digitizer 260 may extend beyond the lateral edges 226, 228 of display 120.

With reference to FIG. 5, a top segment 217 of housing 210 measures the distance from a top edge 222 of display 220 and a top 207 of computing device 100. A bottom segment 219 of housing 210 measures the distance from a bottom edge 224 of display 220 and a bottom 209 of computing device 100. A first lateral segment 213 of housing 210 measures the distance from one of the lateral sides 203 and a lateral edge 226 of display 220. Similarly, a second lateral segment 215 of housing 210 measures the distance from the other one of the lateral sides 203 and another lateral edge 228 of display 220.

In an embodiment, sensor device 230 is positioned within housing 210 on or adjacent to an exterior surface. For example, a front panel 212 of housing 210 may provide access to display 220. The sensor device 230 may be positioned directly underneath front panel 212. To this end, sensor device 230 is positioned apart from display 220 and digitizer 260. In one embodiment, sensor device 230 is positioned on top segment 217 of housing 210. To enable sensor device 230 to measure a deflection, both housing 210 and sensor device 230 may be configured to bend or cantilever. The display 220 and digitizer 260 may be similarly configured. For sensor device 230 such as described with FIGS. 4 and 5, the direction of bending would cantilever top segment 217 into the paper.

Figure 6:
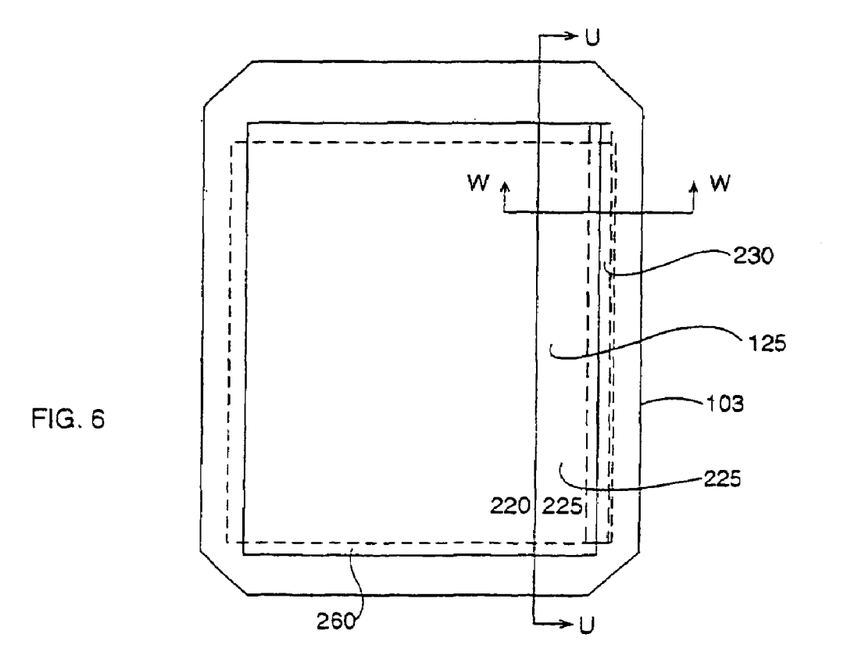
FIG. 6 is a top view of a computing device illustrating another configuration for a sensor device, under an embodiment of the invention.

FIG. 6 illustrates another embodiment in which sensor device 230 is positioned lengthwise within housing 210 of computing device 100, so as to extend between top 207 and bottom 209. Since digitizer 260 may extend towards lateral side 203, sensor device 230 may be positioned underneath both display 220 and digitizer 260. The first lateral segment 213 may overlay at least a portion of sensor device 230 and digitizer 260. The sensor device 230 is deflective to measure a deflection entered by the user. To accommodate the deflection, housing 210, display 220, and digitizer 260 may deflect with sensor device 230, so that lateral side 203 of computing device 100 nearest sensor device 230 deflects into the paper.

With reference to FIGS. 5 and 6, display 220 may be described with reference to a deflected region 225. The deflected region 225 may coincide to a portion of display 220 where presentation of the data collection is altered as a result of the deflection created by the user. The deflected region 225 may also coincide with a region of display 220 that is the boundary of physical deflection on display 220. The deflected region 225 may be positioned center or off-center to best suit positioning of sensor device 230. For example, if one of the lateral sides 203 is deflectable, deflected region 225 may be off-center to accommodate one region of display 220 being deflected. Furthermore, variations to pages being presented from the data collection may be provided on a boundary provided within deflected region 225. For example, when lateral side 203 is bent, pages may appear to be flicked to the left of deflected region 225. In addition, display 220 may include multiple deflectable regions 225.

Figure 7:
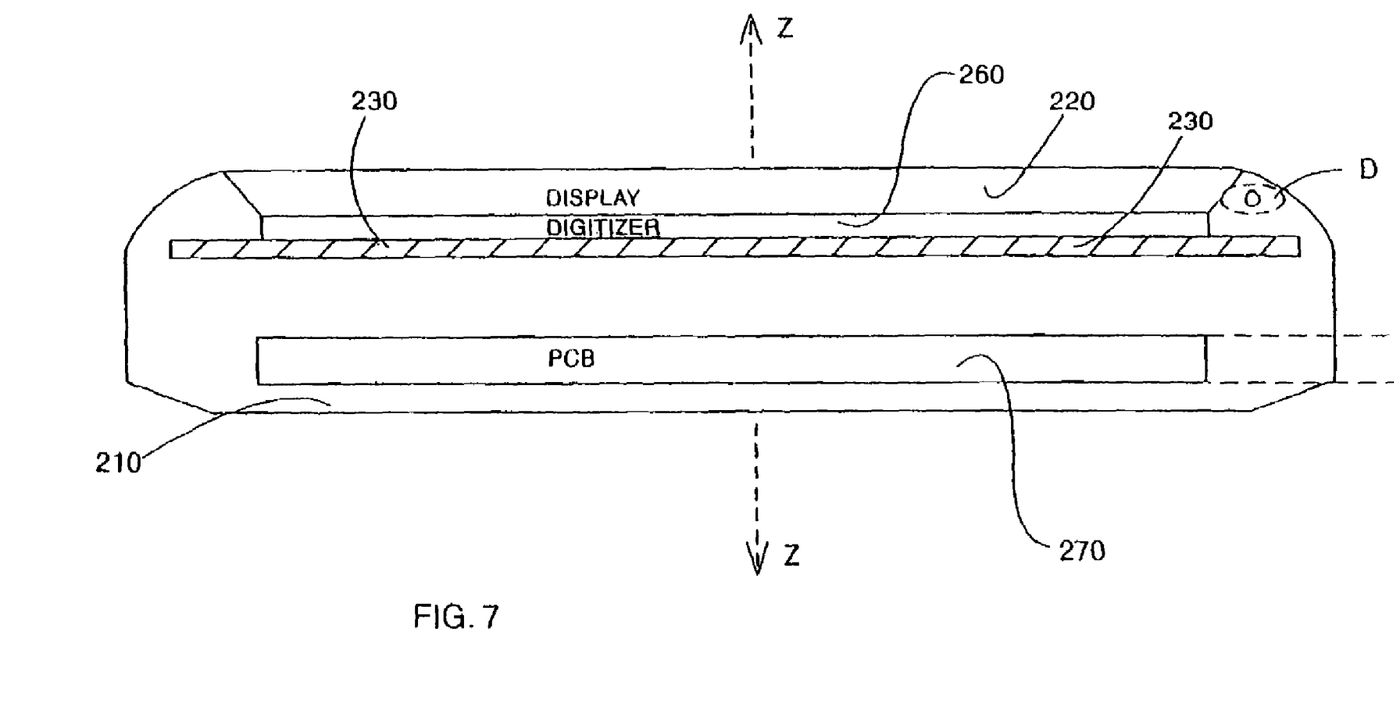
FIG. 7 is a side cross-sectional view of the computing device in FIG. 6, cut along lines U-U, under an embodiment of the invention.

FIG. 7 is a cross-sectional view of computing device 100, cut along lines U-U of FIG. 6. FIG. 7 illustrates sensor device 230 in relation to other components of computing device 100, under an embodiment of the invention. The display 220 is coupled over digitizer 260. The combination of display 220 and digitizer 260 are coupled to housing 210, and positioned over a PCB 270. The PCB 270 may provide components such as processor 140, first memory 144, second memory 146 and other components described with FIG. 4. While display 220 is shown to be overlaid on digitizer 260, other embodiments may provide other configurations. In particular, digitizer 260 may be mounted over display 220, or integrated as one unit with display 220. Still further, computing device 100 may not have digitizer 260, since that component is typically used to enable touch-sensitive entries onto display 220.

In a direction shown by axis Z, sensor device 230 is positioned just underneath digitizer 260. This may correspond to position A. In another embodiment, sensor device 230 may be positioned immediately adjacent (either above or below) to PCB 270. This may correspond to position B or C. The positions A, B, and C are possible for a configuration such as shown with FIG. 6. For a configuration such as shown with FIG. 5, sensor device 230 may be positioned adjacent display 220, such as provided by position D (extending into the paper). In position D, sensor device 230 may be proximate to or adjacent to the front panel 212 of the housing 210, as digitizer 260 does not extend above display 220.

In an embodiment, sensor device 230 measures its own deflection. Therefore, sensor device 230 may be deflectable, and positioned within computing device 100 to enable its deflection by a user. To this end, portions or all of housing 210 may be flexible to bend in an area coinciding with the position of sensor device 230. The display 220 may be bendable to accommodate sensor device 230 being positioned underneath display 220. The digitizer 260 may be similarly constructed if used in cooperation with display 220. The PCB 270 may be flexible to accommodate bending of sensor device 230 in position B, C and possible A. Alternatively, PCB 270 may be shortened or otherwise to be away from a region of computing device 100 that deflects. If sensor device 230 is positioned at D, digitizer 260 and PCB 270 may each be shortened. In this way, the housing 210, and possible display 220, may be the flexible components of computing device 100 that bend for sensor device 230 to enable deflection to be entered as an input.

B. Sensor Device

Figure 8:
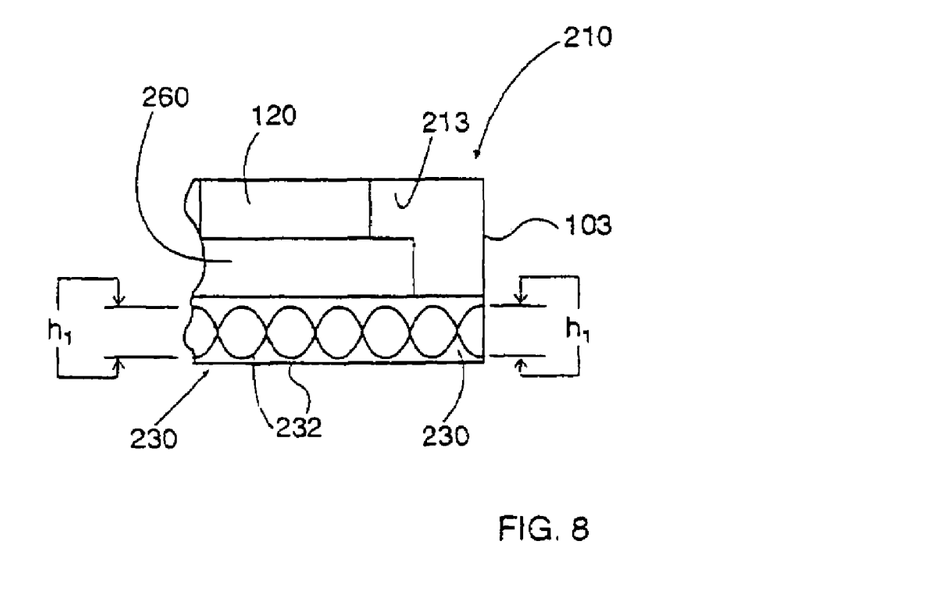
FIG. 8 is an illustrative cross-sectional view of the sensor device of FIG. 6, cut along lines W-W, with the sensor device being in an undeflected position, under an embodiment of the invention.
Figure 9:
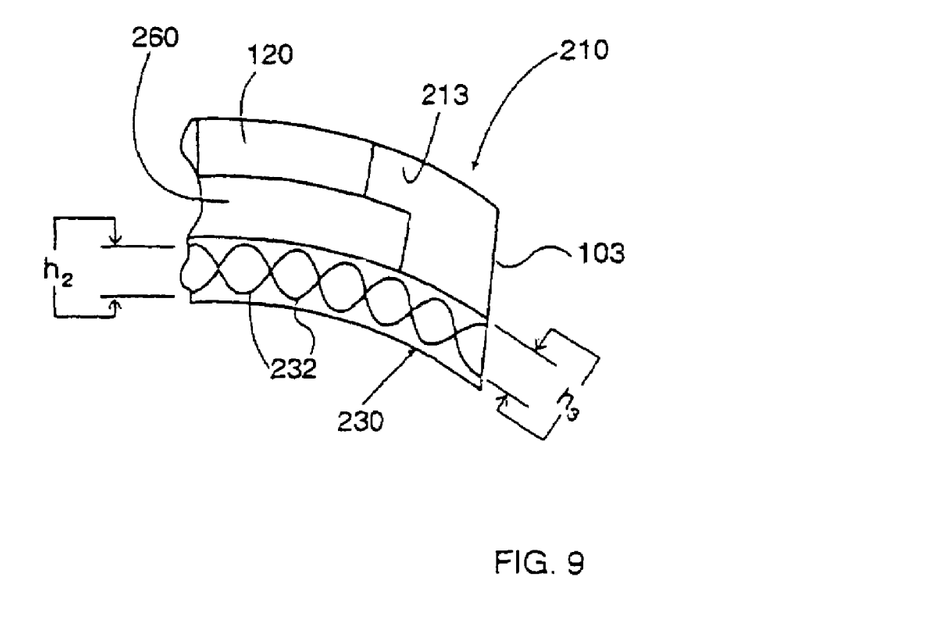
FIG. 9 illustrates the sensor device of FIG. 8 in a deflected position, under an embodiment of the invention.

FIGS. 8-9 illustrate a deflectable sensor device 230 for use with computing device 100, under an embodiment of the invention. FIG. 8 is illustrative of a partial cross-section taken along lines W-W of FIG. 6. In an embodiment shown, display 120 is mounted over digitizer 260, adjacent to first lateral segment 213 of housing 210. The digitizer 260 extends beyond a boundary of display 120 towards lateral side 203 of housing 210. The sensor device 230 is positioned immediately underneath digitizer 260. The sensor device 230 may include one or more conductive elements extending a width of the sensor device 230. To accommodate deflection, display 120, digitizer 260 and sensor device 230 may all be deflectable for the user. The flexure of the deflecting components may be designed to simulate the feel of a book bending to flick pages.

In an embodiment, sensor device 230 includes multiple conductive elements 232 that are intertwined or spaced in cooperation to provide an electrical property measuring a distance between them. The conductive elements 232 may be static and spaced in a default position when sensor device 230 is not deflected. In an embodiment, conductive elements 232 of sensor device 230 are extended perpendicular to the length of sensor device 230. Other embodiments may provide conductive elements 232 to extend lengthwise with sensor device 230.

FIG. 9 illustrates sensor device 230 of FIG. 7 in a deflected position. The conductive elements 232 move relative to one another when sensor device 230 deflects. For example, spacing (labeled as $H_1$) between conductive elements 232 in FIG. 8 is relatively static from one end of the cross-section shown to the other. But in FIG. 9, spacing between conductive elements 232 is changed, and labeled as $H_2$ and $H_3$. Specifically, the spacing between electrical elements 232 may be reduced, so that $H_2$ and $H_3$ are both less than $H_1$. Further, the difference in spacing along sensor device 230 may no longer be static, so that $H_2$ is different than $H_3$. The changes between $H_2$, $H_3$ and $H_1$, as well as between $H_2$ and $H_3$, may be used to measure a magnitude of the deflection. As sensor device 230 is deflected, the spacing between conductive elements 232 is altered, causing a fluctuation in the electrical property. The fluctuation in the electrical property may be detected and measured as an analog value that is subsequently signaled to AD converter 134 (see FIG. 4).

In an embodiment, the electrical property that is fluctuated and measured is a capacitance, existing between the conductive elements 232 through electrical charge or current. Another embodiment may use resistance or inductance between the conductive elements 232, based on changes in charge as a result of positioning of the electrical elements 232 before and after deflection.

C. Page Presentation

A page flicking mechanism such as shown with embodiments of the invention enables a user to enter an input that reconfigures the display 120 to present other pages of paginated content. The other pages may be presented in various formats, preferably in rapid succession, giving the user an impression that the pages are being flicked. In an embodiment, the pages are presented on the display for a duration corresponding to the user providing the flicking input. In this way, the user can track the pages as they are being presented in succession on the display. Further, the user can select a page for viewing by stopping the flicking action.

Figure 10A:
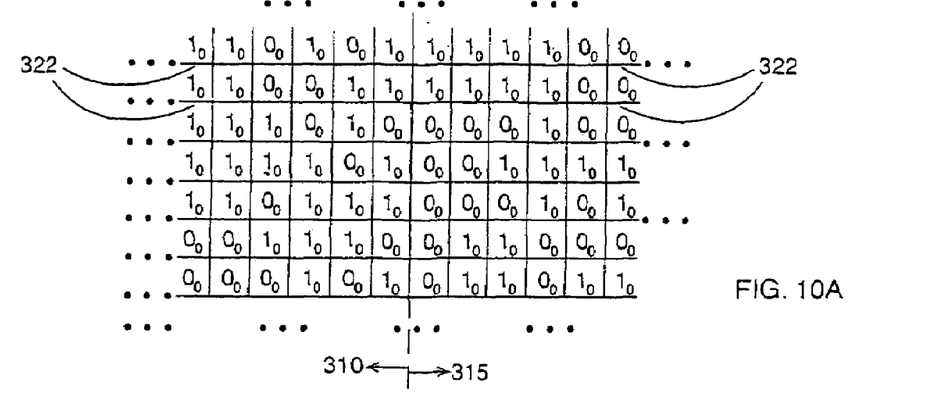
FIG. 10A shows a display prior to receiving a page flicking input from a user.
Figure 10B:
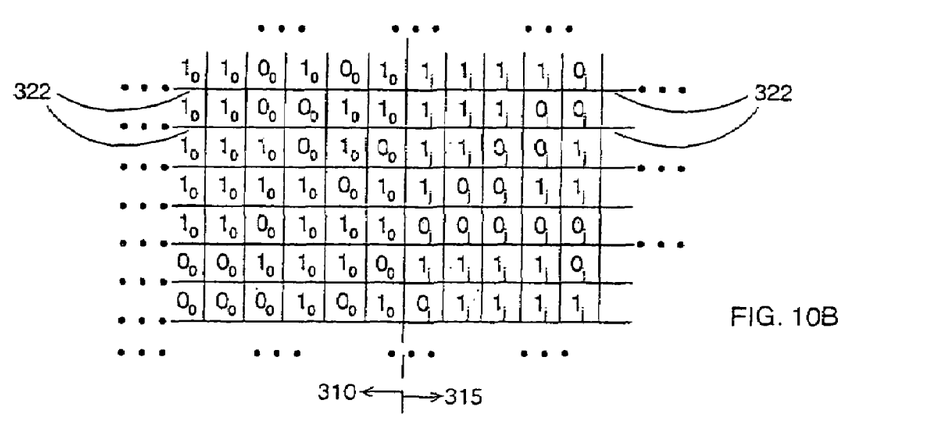
FIG. 10B shows the display in flux, showing a flicked page on at least a portion of the display.
Figure 10C:
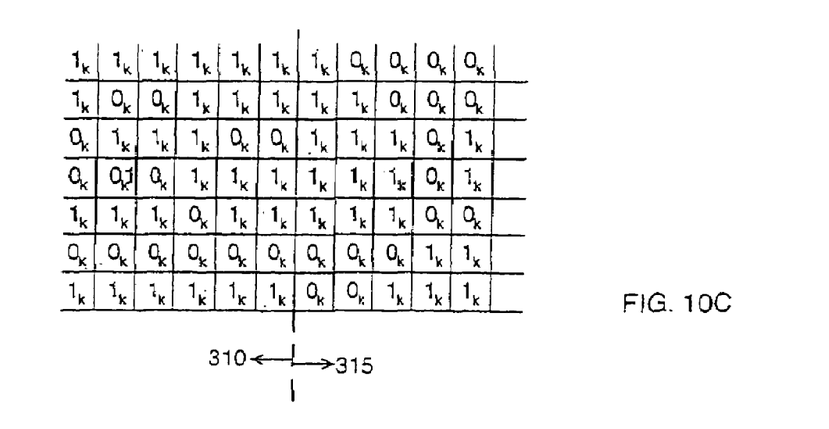
FIG. 10C illustrates the display after the page flick is completed.

FIGS. 10A-10C illustrate configurations for computing device 100, in which stored values of select pages are assigned to discrete elements 322 of display 120 at times before, during and after a page flick. For simplicity, the stored values for each discrete element 322 are described and illustrated with reference to bit values, although values for each discrete element may range depending on the type of display. For example, color displays may use color values using multiple bits.

The stored values that are to be assigned to each discrete element of display 120 are part of a larger data collection representing the paginated content. An example of a data collection configured for paginated presentations is an electronic book. In an embodiment, bit values of each page are stored in first memory 144 (FIG. 4) of computing device 100. Each bit value may be assigned to appear on particular discrete elements 332 of display 120 when that page is selected. Alternatively, values may be assigned to different portions of the display 120 to enable the user to scroll vertically or sideways and view portions of each page on the display.

FIG. 10A-10C illustrates bit values from the data collection at three durations: prior to receiving the page flick (t=0); during the page flick (t=N); and after the page flick (t=F). The pages assigned from each value are denoted by subscripts. The subscript 0 represents the current page. FIG. 10A shows that at t=0, processor 140 presents only the current page. The bit values from that page appear on every discrete element 322.

Upon the page flick being entered by a user, FIG. 10B illustrates the duration N, where pages are sequentially presented. During the duration N, all or portions of display 120 presents multiple pages in sequence, so as to be in flux. An embodiment provides that the current page is presented on display 120 concurrently with another page that is continuously changed until the page flick ends. The current page may be static and appear on first display portion 310. A second display portion 315 may present pages that are continuously changed. The bit values of the pages that are continuously changed are denoted by the subscript J. The pages denoted by J are part of a set presented on second display portion 315 during the duration t=N. The page numbers in the set of pages may range in either direction from the current page, depending on a value of the page flick. The page numbers denoted by J may also skip, or follow one another sequentially. For example, for a large page flick value, the page numbers contained in the set denoted by J may skip. In addition, the number of pages appearing in the set denoted by J may depend on the value of the page flick. For any duration, the page flicking value may be slow or fast. The duration of N may include more pages in the set of J for larger page flick values.

In an embodiment, second display portion 315 is positioned on the most viewable length of display 120. That may correspond to a centrally positioned strip having a width that is only a proportion of the overall width of display 120. If display 120 is bendable, second display portion 315 may correspond to a length of display 120 appearing left of the display's center line. The left side is most viewable if the user is bending a right end of display 120.

FIG. 10C illustrates display 120 at t=F, where discrete elements 322 assert bit values from the final page selected by the user as a result of the page flick. The final page is represented by bit values with subscripts K. In the natural order of the data collection (i.e. sequential page numbers of a book), K may precede or be subsequent to the page represented by the subscripts 0 and J. The page K may be selected as a result of the user viewing one of the many pages presented during the interval N.

While embodiments described with FIGS. 9A-9C describe the current page as being presented concurrently with other pages being flicked, other embodiments may dedicate the entire area of display 120 for pages that are flicked. While this would require more processing and memory resources, the visual effect may be easier to view by the user.

Another embodiment may display only portions of each page being flicked. For example, second display portion 315 may blank every other row of discrete elements 322. The result would be that the portion of display 120 used for displaying flicked pages is blurred, while giving the user sufficient page presentation to enable the user to be able to identify features of characteristics of each page flicked. Blurring the flicked pages in this manner preserves memory and processing resources of computing device 100.

Still further, the computing device 100 may be configured to intelligently blur or omit data from the pages being flicked. Substantially blank pages may be skipped during page flicks. Blank lines or pages may be omitted.

D. Other Embodiments

While embodiments described herein for computing device 100 describe housing 210, it is possible for computing device 100 to not have a housing that is separate from display 120. For example, certain types of electronic paper in production may form the top panel 212 of the housing 210 for computing device 100.

Under another embodiment, a page flicking mechanism may be coupleable to a handheld computer to enable users to flick pages of paginated content provided on the handheld computer. A page flicking mechanism comprising sensor device 230 may be coupled to a port of a handheld computer. Examples of handheld computers for use with such an embodiment includes personal digital assistants (PDAs), such as those manufactured by Palm Inc., or those operating WINDOWS POCKET PC operating systems. The page flicking mechanism may communicate with a processor of the handheld computer through a serial port, wireless port (having infrared, BlueTooth or radio-frequency characteristics), or other communication ports, such as Universal Serial Busses (USB).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A computing device comprising:
a display;
a wireless communication port configured to communicate with an external source to receive or access data corresponding to a portion of a data collection, the data collection being formatted to include a plurality of paginated items that are pre-arranged in a designated order, and wherein each paginated item in the data collection is independently presentable;
a memory configured to store at least a portion of the data collection;
processing resources coupled to the display, the wireless communication port and the memory, the processing resources including a first processor and a second processor, wherein the second processor is configured to control the wireless communication port, and wherein the first processor is configured to store, in the memory, the portion of the data collection using data received or accessed by the wireless communication port, the processing resources being configured to present one or more paginated items from the data collection on the display by retrieving the one or more paginated items from the memory and driving the display to present the one or more paginated items; and
an analog sensor device coupled to the processing resources, the sensor device being configured to detect a physical input;
wherein the processing resources are configured to (i) correlate any one of a magnitude or direction of the input with at least one of a next page input, a vertical scroll input, or a horizontal scroll input, and (ii) respond to at least the next page input by presenting at least a portion of another page from the data collection on the display in place of at least a portion of the presented one or more paginated items, in order to page transition.

2. The computing device of claim 1, wherein the display is deflectable and coupled to the analog sensor device so as to deflect with the analog sensor device.

3. The computing device of claim 2, wherein the physical input results in a deflection of the sensor device.

4. The computing device of claim 1, wherein the analog sensor device measures an analog value corresponding to the physical input.

5. The computing device of claim 4, wherein the analog value identifies a magnitude of the physical input.

6. The computing device of claim 5, wherein the magnitude of the physical input determines a velocity of the page transition.

7. The computing device of claim 1, wherein the analog sensor device is integrated with the display.

8. The computing device of claim 7, wherein only a first portion of the display is overlaid on the analog sensor device to integrate or operate with the analog sensor device.

9. The computing device of claim 7, wherein at least one of the analog sensor device or the display is deflectable so as to cantilever.

10. The computing device of claim 1, further comprising an analog to digital converter to signal the processing resource a digital value corresponding to an analog value measured by the sensor device.

11. The computing device of claim 1, further comprising a digitizer coupled to the display.

12. The computing device of claim 11, wherein the analog sensor device is unitarily formed or integrated with the digitizer.

13. The computing device of claim 11, wherein the display is overlaid on the digitizer, and the analog sensor device is connected to the digitizer and positioned underneath the digitizer.

14. The computing device of claim 1, wherein the characteristic of page turning corresponds to at least a speed at which portions of the multiple paginated items are displayed.

15. The computing device of claim 1, wherein the characteristic of page turning corresponds to at least a difference in a position of the presented one or more paginated items with a position of a next one of the presented multiple paginated items.

16. The computing device of claim 1, wherein at least some of the paginated items in the collection include images, so that at least one of the presented paginated items or one or more of the presented multiple paginated items include one or more images.

17. The computing device of claim 1, wherein the data collection corresponds to an electronic book.

18. The computing device of claim 1, wherein the analog sensor is configured to detect the physical input causing a deflection of a surface on which the analog sensor operates.

19. The computing device of claim 1, wherein the analog sensor is configured to detect a change in capacitance resulting from the physical input.

20. The computing device of claim 1, wherein the physical input corresponds to a flick motion.

21. The computing device of claim 1, wherein the processing resources are configured to display multiple paginated items at once on the display, and wherein the physical input causes at least one or more of the paginated items to be removed or re-arranged relative to other paginated items.

22. The computing device of claim 1, wherein the processing resources are configured to display text within at least one or more paginated items on display.

23. The computing device of claim 1, wherein the processing resources are configured to display an image within at least one or more paginated items on display.

* * * * *